United States Patent [19]

Fox et al.

[11] Patent Number: 5,545,410
[45] Date of Patent: *Aug. 13, 1996

[54] METHOD OF CONTROLLING THE RELEASE OF CARBOHYDRATES BY ENCAPSULATION AND COMPOSITION THEREFOR

[75] Inventors: J. Gary Fox, Princeton Junction; Darlene Allen, Berkeley Heights, both of N.J.

[73] Assignee: The Estee Corporation, Parsippany, N.J.

[ * ] Notice: The term of this patent shall not extend beyond the expiration date of Pat. No. 5,360,614.

[21] Appl. No.: 331,671

[22] Filed: Oct. 31, 1994

Related U.S. Application Data

[63] Continuation-in-part of Ser. No. 53,944, Apr. 26, 1993, Pat. No. 5,360,614.

[51] Int. Cl.⁶ .................. A61K 9/14; A61K 9/28; A61K 9/68; A61K 47/36
[52] U.S. Cl. .............. 424/439; 424/440; 424/441; 424/489; 424/493; 424/494; 424/495; 424/499; 426/89; 426/103; 426/658; 426/660; 426/661; 264/4.1; 264/4.3
[58] Field of Search .................. 424/439, 440, 424/441, 489, 493, 494, 495, 499; 426/103, 658, 660, 89, 661; 264/4.1, 4.3

[56] References Cited

U.S. PATENT DOCUMENTS

| | | | |
|---|---|---|---|
| 3,962,416 | 6/1976 | Katzen | 424/19 |
| 4,029,823 | 6/1977 | Bone et al. | 426/249 |
| 4,039,689 | 8/1977 | Bone | 426/99 |
| 4,055,681 | 10/1977 | Balaz et al. | 426/656 |
| 4,127,678 | 11/1978 | Burkwall, Jr. | 426/250 |
| 4,228,195 | 10/1980 | Priegnitz | 426/321 |
| 4,273,672 | 6/1981 | Vassiliades | 252/316 |
| 4,273,788 | 6/1981 | Bone et al. | 426/104 |
| 4,384,004 | 5/1983 | Cea et al. | 426/3 |
| 4,386,106 | 5/1983 | Merritt et al. | 426/5 |
| 4,540,585 | 9/1985 | Priegnitz | 426/28 |
| 4,748,027 | 5/1988 | Schou et al. | 426/96 |
| 4,753,804 | 6/1988 | Iaccheri et al. | 424/491 |
| 4,804,548 | 2/1989 | Sharma et al. | 426/96 |
| 4,808,429 | 2/1989 | Freeman | 426/647 |
| 4,824,681 | 4/1989 | Schobel et al. | 426/103 |
| 4,900,572 | 2/1990 | Repholz et al. | 426/282 |
| 4,929,447 | 5/1990 | Yang | 424/440 |
| 4,969,955 | 11/1990 | Rudin | 127/71 |
| 5,021,249 | 6/1991 | Bunick et al. | 426/96 |
| 5,089,278 | 2/1992 | Haynes et al. | 426/98 |
| 5,106,639 | 4/1992 | Lee et al. | 426/302 |
| 5,360,614 | 11/1994 | Fox et al. | 424/439 |

*Primary Examiner*—Carlos Azpuru
*Attorney, Agent, or Firm*—Welsh & Katz, Ltd.

[57] ABSTRACT

A composition of carbohydrates having an edible coating is disclosed, whereby the coated carbohydrate, when orally ingested, causes a time delay release of the carbohydrate into the digestive system. The method of administering carbohydrates in this manner may be useful in the treatment of diseases such as diabetes and exercise programs calling for sustained effort.

9 Claims, 1 Drawing Sheet

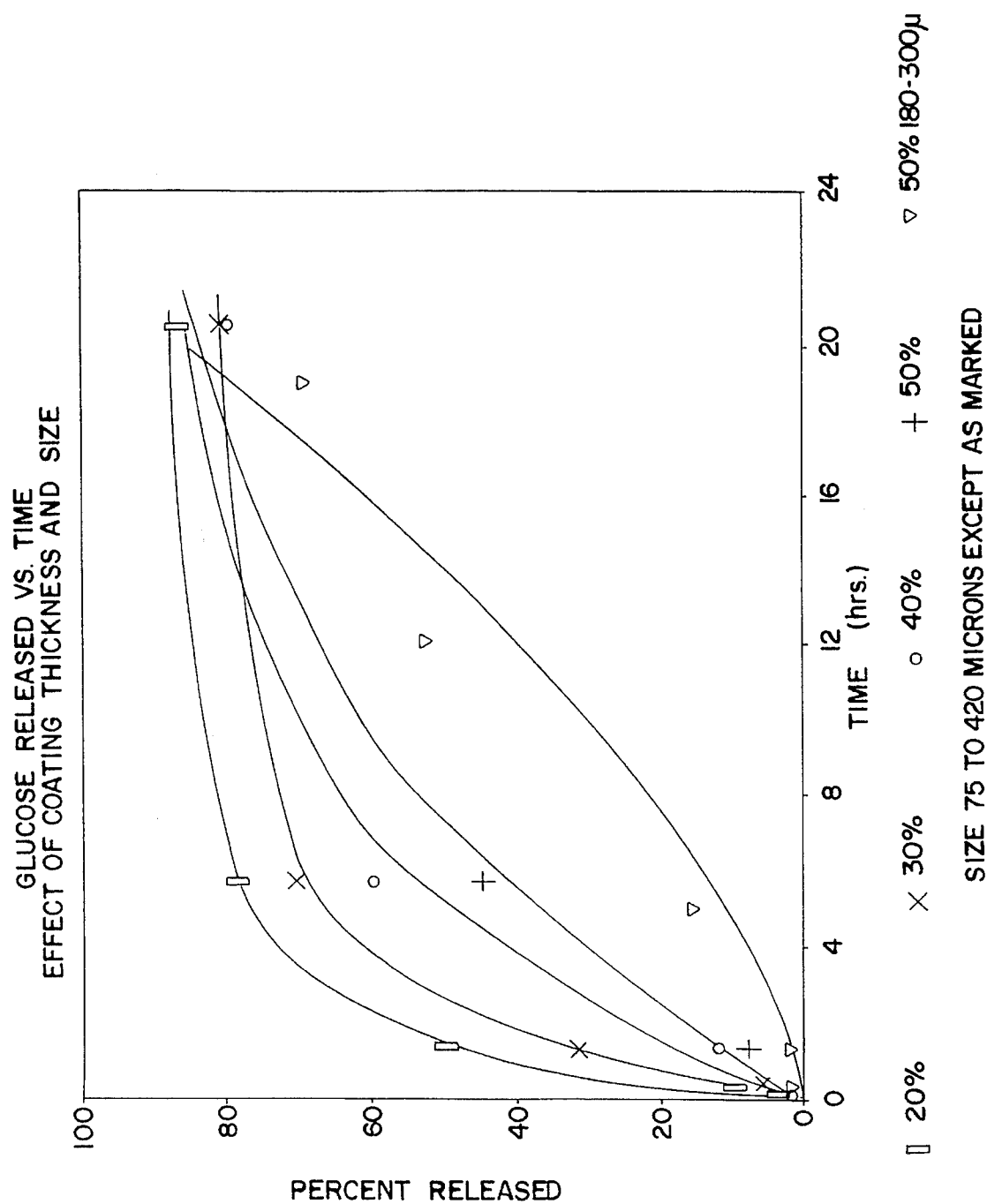

METHOD OF CONTROLLING THE RELEASE OF CARBOHYDRATES BY ENCAPSULATION AND COMPOSITION THEREFOR

This application is a continuation-in-part of Ser. No. 08/053,944, filed Apr. 26, 1993, now U.S. Pat. No. 5,360,614, issued Nov. 1, 1994.

BACKGROUND OF THE INVENTION

The present invention relates to a method for preparing a delayed release encapsulated carbohydrate composition in solid or liquid particulate form for use in snacks, candies and confections, dessert mixes, granola bars, energy bars, various beverages, shelf stable powders, ready to eat foods such as puddings, frozen yogurts, ice creams, frozen novelties; cereals, snacks, meal replacements, baked goods, pasta products, confections, military rations, specially formulated foods for children, and specialized gastric enteral feeding formulations. In addition to human foods, the invention is also useful in pet foods and animal feeds.

In the preparation of various foodstuffs and other ingested items, such as vitamins, drugs and the like, such foodstuffs having been encapsulated to provide a delayed release flavor, medicinal action or the like. As stated above, the subject invention relates to an encapsulated and coated metabolizable carbohydrate composition which has a controlled release upon ingestion whereby the carbohydrates are slowly released into the body's digestive tract. This delayed release action can be very helpful in counteracting the effects of diseases, such as diabetes which is characterized by a raised glucose concentration in the blood due to a deficiency or diminished effectiveness of insulin. The disease is chronic and also affects the metabolism of fat and protein. In general, some cases can be controlled by diet alone while others require diet and insulin, and for still others control with drugs is needed.

When controlling the effects of diabetes in humans and other mammals with diet, the diabetic is advised to control the timing of meals and snacks, control the composition of the food, and monitor the caloric content of the food. The diabetic who eats a high-calorie, high-carbohydrate meal will experience elevated blood glucose levels one-half to one hour after ingestion. To minimize this effect, a physician normally counsels his patient to distribute the carbohydrate load over several spaced snacks and meal occasions. A non-diabetic person could eat a high carbohydrate/caloric meal and the carefully modulated insulin response of his body will maintain the blood glucose levels within normal ranges of 70–120 mg/dl. A diabetic who has impaired insulin metabolic controls has to rely on external control mechanisms, i.e., the timing of meals, the composition of the meals, and the caloric density of the meals. For the more severe cases of diabetes, drugs have been developed which modulate the blood glucose response by interfering with the enzymes which break down starch or sugar in the upper G.I. tract. The effect is to prolong the digestion and absorption of glucose as food traverses the G.I. tract.

Other reasons exist for modulating the blood glucose response, such as the demands of exercise, nutrition, weight control, strenuous working conditions, and the like.

SUMMARY OF THE INVENTION

Therefore, an object of the subject invention is an encapsulated carbohydrate composition which causes a timed delay release of the carbohydrates in the digestive tract of the human body.

Another object of the subject invention is a shelf-stable powder, granulation or agglomeration, capable of being stabilized and suspended in a liquid medium for easier dispersion and a timed release into the digestive tract of the human body.

Another object of the subject invention is a preparation of an encapsulated, insoluble carbohydrate which is stable in a liquid environment and is released by the conditions in the digestive system—pH, moisture, enzymes.

A further object of the subject invention is a method of encapsulating metabolizable carbohydrates as a time-delay mechanism for ingestion and digestion by a subject in a controlled manner.

These and other objects are obtained by the subject invention wherein the release of carbohydrates to the absorption sites in a G.I. tract of a human or animal, is controlled by encapsulating the desired metabolizable solid or liquid carbohydrate (starch, glucose, sucrose, fructose, etc.) in a food or pharmaceutical grade coating. As the encapsulated particle, granulation, or agglomerate moves down the digestive tract, the coating degrades and slowly releases the carbohydrate. Thus, by coating the food particle, absorption in the upper G.I. tract could be experienced over a one-half to four-hour time period which would help modulate the blood glucose levels and possibly eliminate or reduce the need for a diabetic to snack between meals.

In the method of the subject invention, the carbohydrate may be spray-coated in a coating pan or in a fluidized bed, or coated directly on a rotating disc, all in a manner which provides a substantially equal distribution of the coating on the carbohydrate. It is not necessary that the coating film be equally distributed on the particle, but will depend on the particle itself and the use. Both liquid and solid carbohydrates may be coated by use of appropriate coating techniques. The coated particle is then administered.

BRIEF DESCRIPTION OF THE DRAWING

FIG. 1 is a graph showing the percent glucose released as a function of time.

DESCRIPTION OF THE PREFERRED EMBODIMENTS

In the method of the subject invention, metabolizable carbohydrates such as sucrose, glucose, lactose, dextrins, raw starches, modified starches, pregelatinized starches, fructose, maltose and other mono, di, oligo, and polysaccharides which are normally absorbed and metabolized in the digestive tract may be coated with a food or pharmaceutical grade coating such as stearic acid, hydrogenated or partially hydrogenated oils, such as cottonseed, soybean or rape seed oil, calcium stearate, stearyl alcohol, candelilla wax, food grade shellac, hydrocolloids such as CMC, gum arabic, carrageen, gellan, alginates, gelatin, xanthan, pectins, methyl cellulose and the like. The coating may be from any of various processes, including coating in a coating pan, spraying, fluidized bed, or utilizing the rotating disc method such as disclosed in U.S. Pat. Nos. 5,100,592 and 4,675,140. Other methods such as edible film formation, multi-layer emulsions, co-extrusion emulsions, dispersions, granulation/drying, coacervation, and forming/cooling may be used to form the particle.

In the method of the subject invention, the carbohydrate is coated so as to experience controlled, delayed absorption when ingested into the human body. The coated product should result in a shelf-stable powder with particle size range of 30 to 1,000 μm. The actual size of the particle would depend both on dissolution rates desired and organoleptic characteristics of the food system in which it is administered. The particle could also be prepared as an agglomerate of individual particles to improve dispersion. In general, where a smoother textured food is required, such as beverages, a finer particle size range (75–150 μm) would be utilized. For food systems where the food is masticated, larger sized particles could be used (+150 μm). Because the active component is encapsulated by the method of the subject invention, the resulting coated particles would be relatively inert and bland in both aroma and taste. This would allow the coated particle of the subject invention to be incorporated in a variety of foods without affecting the characteristic properties and flavors of the food.

The coating set forth above could be selected to be compatible with the components and preparation of the food. For instance, ethyl cellulose, a non-food ingredient, could be selected for foods containing free fats or oils and elevated preparation temperatures of up to 100° C. Hydrogenated tallow and stearic acid coatings would be suitable where temperatures do not exceed 60° C. and significant quantities of free lipids are not present.

In the following example, several methods of coating carbohydrates are set forth where the in vitro release rates of some of the products which have been obtained by such coating, are shown.

EXAMPLE 1

Coating of Glucose with Stearic Acid in a Coating Pan

D-glucose was sieved to obtain 250 g of a fraction which passed through a 300 μm sieve but was retained by a 177 μm sieve. This was placed into the coating pan such as is commonly used in the pharmaceutical industry to coat tablets. In order to have a sufficient amount of material in the pan for proper mixing and coating, it was found necessary to add another solid which was of a larger size so that after coating, it could be separated from the glucose. Approximately 500 g table salt of about 420 to 500 μm was used for this purpose. Stearic acid, 375 g, was dissolved in 1875 ml of hot (75° C.) ethanol.

The pan was set to rotate 50 to 55 RPM. A two-fluid nozzle was connected to a hot air supply which was regulated between 15 to 22 psi. The ethanol solution was supplied to the liquid side of the nozzle at a rate of about 10 ml/min. Room temperature air was blown into the pan to help evaporate the ethanol. Samples were removed from the pan after 20, 30, 40 and 50 parts of stearic acid had been sprayed per 100 parts of solids being coated in the pan.

After 50 parts were sprayed, the solids were separated by sieving. The fraction 75 to 420 μm was tested except for the highest level of coating where the fraction of 180 to 300 μm was also tested. To test the release, 2 g of the coated sample was shaken in 100 ml of water in a 250 ml plastic bottle (approximately 1 inch travel 60 cycles/min). Periodically, approximately 3 ml of the solution was withdrawn and the concentration determined by measuring the refractive index of the solution relative to that of pure water (differential refractive index). After the measurement, the solution was returned to the bottle. After 1 day, the particles were filtered out of the solution and crushed with a mortar and pestle. The crushed particles were combined with the solution and concentration was measured again. This represents the concentration corresponding to 100% of the glucose released. To obtain the percent glucose release, the glucose concentration in the solution at any time was divided by the concentration corresponding to 100% released. The loading was calculated by dividing the concentration corresponding to the 100% of the glucose released by the concentration corresponding to 2 g uncoated glucose in 100 ml.

FIG. 1 shows the percentage of glucose released from the particles of Example 1 versus time. It may be seen that when the amount of coating increases, the rate of release is decreased. And that the time scale may be adjusted to release the glucose in a time corresponding to the residence time in the gastro-intestinal tract by suitable adjustments in the process.

EXAMPLE 2

Coating on a Rotating Disc With Solutions of Polymers

The rotating disc allows rapid coating of particles. Approximately 100 g glucose passing a 125 μm 8 sieve but being retained by a 75 μm sieve were slurried into 200 ml solution of acetone 4 parts to 1 part of ethanol containing 7.5% w/v ethyl cellulose and immediately poured into the central opening of a rotating vaned disc (8 inches in diameter with 24 vanes) rotating at 10,000 RPM. The particles were dry and were immediately collected. When tested for release, the 75 to 300 μm fraction which had a payload of 89% (11% coating) corresponding to an average wall thickness of 9.6 μm released 82% of its glucose concentration in 5 minutes and 97% in 20 minutes. This coating thus shows only slight protection and would not be sufficient on its own but may serve as a prime coat. A second coat is a hot melt coat containing tristearin, which is applied by spraying from solution. Other fats and fat-like substances, including triglycerides such as tristearin, tripalmitin, trilaurin or glyceryl behenate or mixtures thereof, diglycerides and monoglycerides as well as free paraffin wax, bees wax, carnauba wax, and microcrystalline waxes allowed as part of food or drug components. Proteins may also be utilized as a second coating and may be egg albumin, casein, zein, or soy proteins. Semi-synthetic polymers may also be used and include ethyl cellulose, cellulose acetate phthalate, hydroxypropyl methyl cellulose phthalate. Synthetic polymers also are possible for use as a second coating and include acrylate copolymers approved for coating of medical forms for oral ingestion. Application of these materials may generally be accomplished by spraying from solution, dispersion or emulsion, as appropriate.

EXAMPLE 3

Coating on the Rotating Disc With an Edible Hot Melt

A hot melt was prepared as follows: 26 g stearic acid was melted and heated to 150° C. 10.5 g ethyl cellulose (7 cps) was dissolved in it. 103 g hydrogenated tallow was added and the liquid brought to about 85° C. 70 g of the product from Example 2 passing a 150 μm sieve but being retained by a 75 μm sieve was added to the melt and stirred in to make a homogeneous mixture. The rotating disc used in Example 2 was heated to 80° C. and turned on to rotate at 10,000 RPM and the slurry poured into the opening of the disc at the rate of about 300 ml/min. Two fractions which represented together 83% of the product were tested 75 to 150 μm and 150 to 300 μm. The payload was 34 and 44% respectively. In 5 minutes, the release rate was 51.4 and 20.5%, in 20 minutes 61.2 and 34.7% was released, in 80 minutes, 74.3 and 65.6% was released. After 5 hours, 81% of both fractions were released.

EXAMPLE 4

Coating of Glucose in a Fluidized Bed With a Solution of Ethyl Cellulose 750 g anhydrous glucose, passing a 300 μm screen but being retained by a 177 μm screen was placed in a fluidized bed (6 inch diameter) where it was fluidized with air from below. Ethyl cellulose was dissolved in acetone ethanol 4/1 by volume to make a 3% w/v solution. The solution was sprayed with a two-fluid nozzle using air at an air pressure of 25 psi and a liquid rate of about 8 ml/min. It was sprayed on until 5.4% of coating was deposited. The 75 to 300 μm fraction was tested. 46.8% was released in 5 minutes, 72.6% was released in 20 minutes, 91% was released in 80 minutes.

EXAMPLE 5

Coating of Fructose in a Coating Pan with Stearic Acid

Fructose was sieved to remove particles smaller than 420 μm. 650 g of this was placed in the apparatus described in Example 1 and coated with stearic acid by spraying a 20% w/v solution in ethanol as in Example 1. A sample removed from the run had a payload or glucose content of 75.9%. In the standard release test, it released 45.1% in 10 minutes, 48.2% in 1 hour, 64% in 3 hours, 91% in 19 hours.

EXAMPLE 6

Coating Corn Starch With Hydrogenated Tallow on the Rotating Disc 40 g stearic acid (Witco Hystrene 9718) was melted and heated to 135° C. 20 g ethyl cellulose (Dow, Ethocel of 7) was dissolved in it. Then 140 g of hydrogenated tallow (Kraft) was added and dissolved. 100 g corn starch Mira-Gel 463 (Staley) was dispersed in the melt and sprayed with an 8-inch diameter vaned disc at 10,000 RPM. 245 g of product was collected.

The particles of product ranged from about 30 to 300 μm in size. The original starch granules are about 15 μm; therefore, several of the granules make up a product particle glued together by the hot melt.

To determine the active content, the product was ground with a mortar and pestle and 1 g placed into cellophane tubing with a, 6000 molecular weight cut-off. Also into the tube was placed 30 ml water 0.05 ml BAN 120L amylase, 6 units (Novo Nordisk) and 2 ml AGM 200 L amyloglucosidase 400 units (Novo Nordisk). 1 unit of amylase breaks down 5.25 g of soluble starch per hour at 37° C. and Ph 5.6. 1 unit of amyloglucosidases hydrolyses 1 micromole of maltose per minute at 25° C. and Ph 4.3. The ends of the cellophane were tied, and formed into a U-shape and immersed into 300 ml of acetate buffer of Ph 4.5. The buffer was stirred with a magnetic stirrer and thermostatted at 37° C. 5 ml samples were taken from the buffer after 12, 24, and 48 hours, frozen and analyzed with the Hitachi 747 glucose hexokinase method. A calibration with glucose in the presence of the enzyme is necessary. The amount of glucose liberated from this sample was 49% of that of the uncoated Mira-Gel and did not change appreciably after 12 hours.

To determine the rate of available glucose in a simple simulated digestion, we proceeded as above, except 821 mg of unground product containing 403 mg of starch was used. The buffer was sampled at 20 minutes, 1 hour, 4 hours and 8 hours after the start of the experiment. The samples were frozen and later analyzed. The coated Mira-Gel starch showed the following release:

| Time | Coated Starch |
| --- | --- |
| 20 minutes | 14% |
| 1 hour | 32% |
| 4 hours | 72% |

Controlled release of carbohydrates from raw, modified or pre-gelatinized starch granules derived from other starchy foods would also be achievable by the above encapsulation methods.

This would include starches obtained from cereals, such as wheat and rice, and from starches obtained from root crops, such as potato and tapioca.

Diabetes patients who are taking insulin or oral hypoglycemic drugs are prone to low blood sugar reactions especially during or after exercise or increased activity. Low blood sugar or hypoglycemia is defined as a blood glucose level below 50 mg/dl and is potentially a very serious, acute complication of diabetes. A normal blood sugar range is generally 70 to 120 mg/dl. Symptoms of hypoglycemia range from shakiness, light-headedness and tachycardia to headache, blurred vision, poor coordination and eventually to loss of consciousness and death. There are two main counter-regulatory hormones that help the body recover from hypoglycemia: glucagon and epinephrine. Decreased hormone secretion in people who have had diabetes for several years can cause more frequent low blood sugar reactions and more difficulty in noticing that blood sugar is low.

To exercise safely, diabetics often have to increase food intake either before, during or after exercise. Exercise of moderate intensity (doubles tennis, leisurely biking, golfing) requires about 10 to 15 grams of carbohydrates per hour of exercise. One to two hours of strenuous activity may require 25 to 50 grams of additional carbohydrates. A beverage or snack bar with controlled release carbohydrates lends itself to preventing low blood sugar during and after exercise.

Controlled release carbohydrates (CRC) may be described as a shelf-stable powder with a particle size range of 30–1000 μm. Products in which a smooth, non-gritty texture was desired would utilize the finer particle size range. Products which are granular or have large particles could utilize the larger particle size range.

When the active components are encapsulated according to the subject invention, CRC powders are relatively inert and bland in both aroma and taste. This will allow CRC to be incorporated in a variety of foods without affecting the characteristic properties and flavor of food. Alternatively, colorants and flavors can be added to coatings to improve consumer acceptance. Emulsifiers can be incorporated as part of coating to aid in dispersion in the food system.

CRC powders in which the carbohydrate is readily water soluble releases its load by a diffusion process as it transits the digestive system. Therefore, these products would have to be prepared by mixing in a liquid system or a viscous food system, e.g., yogurt, and consumed 5–15 minutes after preparation.

CRC powders may be prepared in which the carbohydrate is a raw, pre-gelatinized, or modified starch. The carbohydrate load would be released by hydration, swelling and reaction with the digestive amylases. Hence, CRC powders based on starch granules would have extended stability in liquid systems. This would extend the food application to RTE foods (puddings, yogurts, frozen novelties) and ready to drink beverages.

CRC powders may be added to food products which are low in water activity—dry beverages, nutritional beverage powders, dessert mixes. Product would be prepared according to recipe and consumed.

CRC powders may be used as a sole source of carbohydrates in the food or in combination with uncoated rapidly absorbed carbohydrates.

CRC powders are designed to release the bulk of their carbohydrate payload within approximately four hours after ingesting. Release times significantly longer than four hours would incur the release of excessive carbohydrates in to the large intestine. This would affect the osmotic water balance and increase the risk of bacterial fermentation leading to increased gas formation and laxation.

Calculation of Caloric Delivery for CRC Materials

CRC products may be produced by coating glucose granules with stearic acid as in Example 1. Glucose payload should be approximately 75% and coating thickness should be adjusted to give 80% release within 1–4 hours after ingestion.

Based on the above parameters, each 100 kcal of energy from glucose released would require 41.7 g of material.

Calculation

100 Kcal/4 Kcal per gram glucose =25.0 g glucose
25 g/0.75 payload delivery =33.3 g CRC at 100% release
33.3 g/0.80 release factor =41.7 g CRC at 80% release The carbohydrate load and release rate can be adjusted to individual nutritional needs and product application.

Examples of different caloric deliveries using the above example are listed below:

Product Applications for Controlled Release Carbohydrates (CHO)

1. 25.0 g CRC delivers 15 g CHO and 60 kcal energy.
2. 41.7 g CRC delivers 25 g CHO and 100 kcal energy.
3. 50.0 g CRC delivers 30 g CHO and 120 kcal energy.

Nine ounces of prepared beverage is formulated to provide 22 g of readily absorbable, uncoated carbohydrates plus 30 g of controlled release carbohydrates. The CRC material is encapsulated to release as follows:

| Time | CHO Released | Calories | Total Calories |
|---|---|---|---|
| Start exercise | 22 g | 88 | 88 |
| 60 minutes | 15 g | 60 | 148 |
| 120 minutes | 15 g | 60 | 208 |

This controlled release beverage would support two hours of strenuous exercise. If a diabetic wants to support three hours of moderate exercise, such as a round of golf, he or she would only drink 6 ounces of beverage. This would provide:

| Time | CHO Released | Calories | Total Calories |
|---|---|---|---|
| Start exercise | 15 g | 60 | 60 |
| 60 minutes | 10 g | 40 | 100 |
| 120 minutes | 10 g | 40 | 140 |

While there will always be individual differences between people, this product would generally enable the diabetic exerciser to maintain a blood sugar level between and 180 mg/dl, providing they start in this range.

By incorporating CRC into a snack bar similar to an "energy bar" or "granola bar," similar release rates could be obtained. Although there may be a limited amount of CRC granules crushed through chewing, the bulk will be ingested intact as part of the swallowed bolus. The quantity of readily absorbable carbohydrate released by chewing would be factored into the requirements for the calories required at the start of exercise.

The caloric load in a 9 oz. beverage sample could be incorporated in a single bar scored into 3 parts. For two hours of strenuous exercise, the subject eats the whole bar. For three hours of moderate exercise, the subject eats two of the three parts, with additional carbohydrate left for future consumption. Alternatively, the carbohydrate load might be delivered in 3 separate smaller bars.

Hypoglycemia can be a serious problem for a diabetic during the night—usually around 3 a.m. A bedtime beverage which is taken ½ hour before sleep should be formulated to provide 15 g of uncoated carbohydrates for normal absorption and 15 grams of CRC for slow release.

| Time | CHO Released | Calories | Total Calories |
|---|---|---|---|
| Start sleep | 15 g | 60 | 60 |
| 60 minutes | 5 g | 20 | 80 |
| 120 minutes | 5 g | 20 | 100 |
| 180 minutes | 5 g | 20 | 120 |

The above regimen will prevent a significant fall in blood glucose during the night for those who have exercised vigorously during the day and are at risk of hypoglycemia for up to 30 hours after the exercise. If the blood sugar is well controlled, the overnight blood sugar will remain within the acceptable range of 70–140 mg/dl. Individual variations exist and release curves and levels would be adjusted based on individual medical needs.

The product made with CRC may contain other nutrients, e.g., fiber, vitamins, and minerals to provide additional nutritional benefits.

EXAMPLE 7

Artificially sweetened powdered soft drink with 42 grams coated glucose in 8 oz of beverage.

|  | Amount | % |
|---|---|---|
| Coated glucose from Example 1 | 42.00 g* |  |
| Guar gum | .40 | (.10–.60) |
| Aspartame | .04 | (.02–.10) |
| Citric acid | .30 | (.10–.60) |
| Trisodium citrate | .26 | (.15–.40) |
| Dried citrus flavor | .24 | (.05–4.0) |
| Red #40 | .01 | (.005–.15) |
| Polysorbate | .01 | (.005–.03) |
|  | 43.26 g |  |

*100 kcal from glucose - 25 grams glucose

Add powder to 8 fl. oz. of cold water and shake or stir thoroughly and drink.

Using the above example, uncoated sugars such as fructose, glucose or sucrose could be added to deliver a portion (10–50%) of the caloric requirements and the level of coated glucose decreased correspondingly.

EXAMPLE 8

|  | Amount | % |
|---|---|---|
| Coated glucose of Example 1 | 21.00 g* |  |
| Fine Granular Glucose | 22.00 | (5.0–50.) |
| Guar Gum | .40 | (.10–.60) |
| Aspartame | .04 | (.02–.10) |
| Citric acid | .30 | (.10–.60) |
| Trisodium citrate | .26 | (.15–.40) |
| Dried citrus flavor | .24 | (.05–4.0) |
| Red #40 | .01 | (.005–.15) |
| Polysorbate | .01 | (.005–0.3) |
|  | 44.26 g |  |

Formula delivers 12.6 g of carbohydrate from CRC and 22 g of carbohydrate from glucose.

EXAMPLE 9

| Instant chocolate pudding | Amount | % |
|---|---|---|
| Coated fructose of Example 5 | 42.00 g |  |
| Pregel. corn starch | 18.35 | (12–24) |
| Monopotassium phosphate | 1.80 | (1.4–2.2) |
| Tetrapotassium pyrophosphate | 1.80 | (1.4–2.2) |
| Mono and diglycerides | .70 | (.4–1.0) |
| Cocoa powder | 12.00 | (8.0–16.0) |
| Aspartame | .28 | (.2–.4) |
| Vanilla flavor | .07 | (.01–1.4) |
|  | 77.00 g |  |

Recipe

Pour mix into bowl. Add 2 cups cold skim milk and blend for 2–3 minutes with beater. Pour into serving cups. Chill. Makes four ½ cup servings.

EXAMPLE 10

| Snack Bar | Amount | % |
|---|---|---|
| CRC Example 1 | 25.00 g | (5.0–50.) |
| Glucose | 7.00 | (4.0–10.) |
| Granola cereal | 8.75 | (4.0–10.) |
| Vegetable | 2.00 | (1.0–4.0) |
| Glycerine | 1.50 | (0.5–3.0) |
| Water | 1.00 | (0.5–3.0) |
| Sweet whey | 1.00 | (0.2–2.0) |
| Lecithin | .15 | (0.5–.30) |
| Cinnamon | .15 | (0.5–.30) |
| Flavoring | .10 | (.02–.20) |
|  | 46.65 g |  |

Formula delivers 15 g carbohydrate from CRC and 15 g untreated carbohydrates from glucose and the granola cereal blend (rolled oats, wheat, glucose syrup).

EXAMPLE 11

|  | Amount | % |
|---|---|---|
| CRC (Ethyl cellulose coating 15 g carbohydrate) | 25.00 g | (5–40) |
| Sucrose | 25.00 | (15–35) |
| Chocolate liquor | 28.20 | (10–35) |
| Cocoa butter | 21.00 | (10–35) |
| Lecithin | .50 | (0.2–1.0) |
| Natural Flavor | .30 | (0.1–0.6) |
|  | 100.00 g |  |

Formula delivers 15 g carbohydrate from CRC and 33 g carbohydrate from sucrose and chocolate liquor.

EXAMPLE 12

Breakfast Cereals—Instant Oat Meal

Breakfast cereals provide a significant amount of carbohydrate per serving. A one ounce (28 g) serving of unsweetened corn flakes provides 24 grams of carbohydrate or 8% of the daily value. Sugar sweetened corn flakes would provide slightly more carbohydrates, 26 g, because of the added sugar. Clinical and psychological studies have indicated that mental and physical skills are enhanced if blood glucose levels can be optimized and mild or reactive hypoglycemia can be avoided.

CRC incorporated into cereals provides sustained carbohydrate release which would maintain glucose levels over a 1–4 hour time period. In addition to improving performance skills, maintaining blood glucose levels between meals has an appetite suppressant effect which could be of value in weight loss and control regimens.

Targeting 50% of total carbohydrate per serving derived from CRC, the following levels would be added to an oatmeal formulation.

| Ingredient | percent | per/28 g | % CHO | Total CHO |
|---|---|---|---|---|
| Instant Rolled oats | 50% | 13.9 g | 72.30 | 10.1 g |
| CRC | 50% | 14.1 g | 71.25 | 10.0 |
| Core CHO 75% Release 95% | 100% | 28.0 g | | 20.1 g |

The amount of carbohydrates delivered from CRC could be varied from 5–50% by changing the ratios of the oats and CRC. The composition can be flavored with salt, spices, and other flavorants. If additional sweetness is desired, intense sweeteners such as aspartame, ace-K, sucralose could be added. CRC could be added to the oat cereal by simply mixing CRC powder into the dried oat blend before packaging.

Encapsulating materials such as methyl cellulose or food grade waxes would be preferred coatings for more soluble carbohydrate cores such as glucose, sucrose, lower weight maltodextrins, etc. To provide increased heat and moisture stability, less soluble carbohydrate cores, such as starch, higher molecular weight dextrins, carbohydrate polymers, etc., would be preferable.

CRC technology can be adapted to a wide range of grain based hot cereals—oats, farina, wheat, rice and corn. For cereals which are consumed cold and which are formed by cooking extrusion, baking, puffing, or flaking processes, CRC would be added in a post processing and before packaging. This could be accomplished by spraying the formed cereal with an adhesive mixture of sugar syrup, adhesive edible gums or the like, and coating the CRC onto the surface in a coating reel or coating drum as is current industry practice to adhere particulates such as nuts, flavors or vitamins and minerals.

In addition to grain based cereals, baked goods, such as breads, rolls, sweet doughs, biscuits, donuts, pies, pastries, cake, and cookies could be fortified with CRC to provide sustained energy. As with cereal applications, the selection of the core and coating or encapsulating material would be tailored to the processing conditions and consumption usage.

CRC also lends itself to the development of enhanced energy military rations to extend physical performance. CRC could be incorporated into field and combat rations to provide sustained energy for military personnel under conditions of extreme physical exertion.

CRC could be incorporated into food, snacks and candies designed for children. CRC could slow down or modulate the release of the sugar after ingestion, preventing a "sugar high". and also providing sustained energy for the child between meals, CRC would also be of benefit in meal replacements products such as instant breakfast powders and ready to drink breakfast meal replacements. A portion of the carbohydrates would be encapsulated to provide sustained energy release.

Hospital patients often require supplemental enteral feedings (tube feedings) to obtain proper nutrition. The use of high concentrations of simple sugars in the liquid formula can lead to complications in diabetic patients. A high level of soluble sugars in the formula would have an irritating effect on the gastric lining of patients receiving the food due to its high osmolality. CRC incorporated as part of the feeding formula would release soluble sugars after the food or liquid has left the stomach. Adverse osmolality effects would be greatly reduced. The diabetic patient would also benefit from the extended release profiles (1–4 hours) which would help modulate blood glucose levels.

In addition a pet food could utilize the coated carbohydrate of the subject invention. A suitable formula for dry dog food is as follows:

EXAMPLE 13

| Coated Glucose From Example 1 | % Red Meat Color Base | % Fat (White) Colored Marbling | % Total Formula |
|---|---|---|---|
| Coated Glucose From Example 1 | 29.17 | 29.41 | 29.22 |
| Collagen | 17.48 | 17.45 | 17.48 |
| Soy Protein Concentrate | 11.49 | 16.45 | 12.48 |
| Meat By-Product | 6.99 | 6.98 | 6.99 |
| Sorbitol | 5.99 | 5.98 | 5.99 |
| Propylene Glycol | 5.99 | 5.98 | 5.99 |
| Meat & Bone Meal | 5.00 | — | 4.00 |
| Dicalcium Phosphate Dihydrate | 4.57 | 4.89 | 4.63 |
| Animal Fat | 3.48 | 3.49 | 3.48 |
| Sodium Chloride | 1.00 | 1.00 | .99 |
| Vitamin-Mineral Mix | .60 | — | .48 |
| Potassium Chloride | .50 | .50 | .50 |
| Potassium Sorbate | .10 | — | .08 |
| FD&C Red No. 40 | .01 | — | .01 |
| Titanium Dioxide | — | .30 | .06 |
| Water | 7.62 | 7.58 | 7.61 |

Two doughes are prepares with the above ingredients.

Each dough is processed separately in the following manner. The dry ingredients are added to a 200-lb. Ribbon Mixer and mixed for 1 minute. A 400-lb. Sigma Blade Mixer may be used as well. The wet ingredients are combined in a meat tub, hot water added and mixed by hand allowing for at least partial melting of the fat. This mixture is then poured onto the dry mix in the mixer with the mixer on and blended for three minutes. The mix was then hand-fed into a screw extruder.

The red dough is extruded at a rate capable of producing 300-lbs./hour while the white dough is extruded at a rate capable of producing 150–200 lbs./hour. The temperature is maintained at 240°–245° F. in both the extruder and the die.

The combined dough is then discharged onto an air cooled conveyor. Any conveyor system such as water cooled conveyors, may be utilized within the scope of the present invention. The speed of the belt is adjusted so as to obtain a steady stream of extrudate on the belt. A speed setting of 12 feet per minute is used to produce the product of the present example.

The product is then cooled and cut into bite size pieces. The product has a soft, marbled meat appearance which is firm, non-sticky and temperature stable.

The coated glucose made possible the controlled delayed release of glucose into the dog's digestive tract, which may be used to control the intake of sugars and other carbohydrates by the dog and other mammals in the treatment of a diabetic condition.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. An edible ingredient for use in foods and beverages selected from the group consisting of hot and cold breakfast cereals, baked goods, field and combat rations, instant breakfast powders and enteral solutions, said ingredient comprising:
   a) a core formed of a metabolizable carbohydrate throughout;
   b) said core having a time delay release coating for slowly degrading said coating in the digestive tract and releasing said metabolizable carbohydrate substantially only into the digestive tract of the body;
   c) whereby said coated core has a particle size from 30–1000 μm and is shelf stable.

2. The ingredient of claim 1 wherein said coated core has a size of from 150–300 μm.

3. The ingredient of claim 1 wherein said core is selected from the group consisting of sucrose, glucose, lactose, dextrins, pregelatinized starches, raw starches, modified starches, fructose, maltose, monosaccharides, disaccharides, oligosaccharides, and polysaccharides.

4. An edible ingredient for use in foods selected from the group consisting of hot and cold breakfast cereals, baked goods, field and combat rations, instant breakfast powders and internal solutions, said ingredient comprising:
   a) a core formed of a metabolizable carbohydrate throughout;
   b) said core having a time delay release coating said, coating providing for the degradation of said coating in the stomach and intestines for the release of substantially all said metabolizable carbohydrate into the stomach and intestines;
   c) whereby said coated core has a particle size of about 30 μm to about 1000 μm and is shelf stable.

5. A method for the controlled administration of metabolizable carbohydrates in the digestive tract of a mammalian subject comprising the steps of:
   a) coating with an edible coating a carbohydrate selected from a group consisting of raw starches, modified starch to form a coated carbohydrate having a particle size of about 30 μm to about 1000 μm; and
   b) orally administering an effective amount said coated carbohydrate to said mammalian subject, whereby said coating is slowly degraded in the digestive tract of the subject for the controlled release of the carbohydrate in the digestive tract.

6. The method of claim 5 wherein the step of coating includes coating so as to reach a particle size of 75 μm to 500 μm.

7. The method of claim 5 wherein the step of coating includes coating so as to reach a particle size of 150 μm to 500 μm.

8. The method of claim 5 wherein the step of coating includes a coating procedure selected from the group consisting of spraying, pan coating, fluidized bed coating and using a rotating disc.

9. The method of claim 5 wherein said carbohydrate is liquid.

* * * * *